(12) United States Patent
Zhang

(10) Patent No.: US 12,429,725 B2
(45) Date of Patent: Sep. 30, 2025

(54) DISPLAY DEVICE

(71) Applicant: WUHAN CHINA STAR OPTOELECTRONICS TECHNOLOGY CO., LTD., Wuhan (CN)

(72) Inventor: Peng Zhang, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 17/290,697

(22) PCT Filed: Mar. 31, 2021

(86) PCT No.: PCT/CN2021/084483
§ 371 (c)(1),
(2) Date: Dec. 25, 2023

(87) PCT Pub. No.: WO2022/198704
PCT Pub. Date: Sep. 29, 2022

(65) Prior Publication Data
US 2024/0126113 A1    Apr. 18, 2024

(30) Foreign Application Priority Data

Mar. 24, 2021    (CN) .......................... 202110311354.8

(51) Int. Cl.
*G02F 1/1335*    (2006.01)
*G02F 1/1333*    (2006.01)
*G02F 1/13357*   (2006.01)

(52) U.S. Cl.
CPC .... *G02F 1/133509* (2013.01); *G02F 1/13338* (2013.01); *G02F 1/133615* (2013.01)

(58) Field of Classification Search
CPC ....................................... G02F 1/1333–133615
See application file for complete search history.

(56) References Cited

U.S. PATENT DOCUMENTS 7,626,675 B2 * 12/2009 Li ....................... G02F 1/13394
349/155
10,534,221 B1 * 1/2020 Zhu ................... G02F 1/133602
(Continued)

FOREIGN PATENT DOCUMENTS

| CN | 108803144 A | 11/2018 |
| CN | 109637364 A | 4/2019 |
| CN | 110515237 A | 11/2019 |

(Continued)

*Primary Examiner* — Jason M Han
(74) *Attorney, Agent, or Firm* — PV IP PC; Wei Te Chung

(57) ABSTRACT

The display device includes a display panel, a backlight module, and a light-blocking member. The backlight module is formed with a through hole penetrating the backlight module, and the light-blocking member includes a channel corresponding to the through hole. The light-blocking member can isolate other components of the backlight module from the channel to prevent light in the backlight module from being irradiated into the channel, thereby solving the problem that the light leaks easily into the through hole of the backlight module in an existing under-screen camera display devices.

18 Claims, 3 Drawing Sheets

(56) References Cited

U.S. PATENT DOCUMENTS 10,788,695 B2 * 9/2020 Cheng ............... G02F 1/133512
2009/0002563 A1 1/2009 Barnhoefer et al.

FOREIGN PATENT DOCUMENTS

| CN | 209911705 U | 1/2020 |
| CN | 110780485 A | 2/2020 |
| CN | 110865478 A | 3/2020 |
| CN | 111427195 A | 7/2020 |
| CN | 111708208 A | 9/2020 |
| CN | 212181213 U | 12/2020 |
| WO | 2019240331 A1 | 12/2019 |

* cited by examiner

DISPLAY DEVICE

TECHNICAL FIELD

The present invention relates to the field of display technologies, and in particular to a display device.

BACKGROUND

With the development of liquid crystal display (LCD) technologies, full-screen technology with higher screen-to-body ratio, larger effective display region, and more stunning display effects has gradually become a mainstream. Existing full-screen display devices have adopted a camera module and other functional components disposed under a display panel to achieve a full-screen display effect, which involves in-plane perforation technology.

As shown in FIG. 1, FIG. 1 is a schematic structural diagram of a conventional under-screen camera display device. The under-screen camera display device is composed of a backlight module 11, a liquid crystal display panel 12, and a camera module. The backlight module 11 includes a metal back plate 111, a light source, a reflection sheet 112, a light guide plate 113, a diffusion sheet 114, and a brightness enhancement sheet 115. The liquid crystal display panel 12 includes a lower polarizer 121, an array substrate 122, a liquid crystal layer, a color film substrate 123, and an upper polarizer 124. The backlight module 11 is formed with a through hole H1 penetrating the backlight module 11, no light source is provided in the through hole H1, and the through hole H1 is only used as a channel for the camera module disposed under the through hole H1 to acquire ambient light. In order to prevent the light in the backlight module 11 from leaking into the through hole H1, affecting a shooting effect of the camera module and a display effect of a region of the liquid crystal display panel 12 corresponding to the through hole H1, the metal back plate 111 of the backlight module 11 is usually bent into the through hole H1 and is close to an inner wall of the through hole H1. The metal back plate 111 is used as a blocking wall to isolate the through hole H1 from the light in the backlight module 11 to prevent the light in the backlight module 11 from leaking into the through hole.

Technical Problem

As shown in FIG. 1, since a thickness of the metal back plate 111 is generally greater than or equal to 0.1 millimeter (mm), when the metal back plate 111 is used as a blocking wall, an adhesive frame 116 is configured to fill a gap between the metal back plate 111 and the backlight module 11 and the display panel 12. At the same time, a light-shielding adhesive 117 needs to be coated on a periphery of the through hole H1 on a side of the backlight module 11 close to the display panel 12 to prevent the light in the backlight module 11 from leaking into the through hole H1. A part of the metal back plate 111 the blocking wall, and the adhesive frame 116 as well as the light-shielding adhesive 117 will block part of the light from being irradiated into the liquid crystal display panel 12, so that a brightness of an edge of the region of the liquid crystal display panel 12 corresponding to the through hole H1 is lower than a brightness of other adjacent regions, resulting in a clear transition line at the edge of the region of the liquid crystal display panel 12 corresponding to the through hole. However, if the metal back plate 111 is not bent into the through hole H1 as a blocking wall, the light in the backlight module 11 will leak into the through hole H1, which will affect the shooting effect of the camera module and the display effect of the region of the liquid crystal display panel 12 corresponding to the through hole H1.

In summary, the existing under-screen camera display devices have a problem that the light leaks easily into the through hole of the backlight module. Therefore, it is necessary to provide a display device to improve this defect.

SUMMARY

Technical Solutions

An embodiment of the present application provides a display device, which is used to solve a problem that the light leaks easily into the through hole of the backlight module of existing under-screen camera display devices.

An embodiment of the present application provides a display device, and the display device includes:
  a display panel;
  a backlight module disposed on a back side of the display panel, wherein the backlight module is formed with a through hole penetrating the backlight module; and
  a light-blocking member at least partially disposed in the through hole, wherein the light-blocking member includes a channel corresponding to the through hole.

According to an embodiment of the present application, the light-blocking member includes:
  a first light-blocking portion with a hollow cylindrical structure, wherein the first light-blocking portion is at least partially disposed in the through hole; and
  a second light-blocking portion formed by extending an end of the first light-blocking portion away from the display panel to an outside periphery of the first light-blocking portion, wherein the second light-blocking portion is fixed on a side of the backlight module away from the display panel.

According to an embodiment of the present application, an end of the first light-blocking portion close to the display panel protrudes from the through hole.

According to an embodiment of the present application, the end of the first light-blocking portion close to the display panel is bonded to a bottom of the display panel by a light-shielding adhesive.

According to an embodiment of the present application, the channel is sleeved in the through hole.

According to an embodiment of the present application, a planar shape of the through hole on a plane perpendicular to an axial direction of the through hole is any one of circular, elliptical, rectangular, drop-shaped, or irregular-shaped, and a planar shape of the channel is the same as the planar shape of the through hole.

According to an embodiment of the present application, the light-blocking member is made of metal.

According to an embodiment of the present application, a thickness of a sidewall of the light-blocking member opposite to the through hole is less than or equal to 0.1 millimeter.

According to an embodiment of the present application, the display device further includes a light-shielding rod, wherein the light-shielding rod is at least partially disposed in the channel.

According to an embodiment of the present application, the light-shielding rod includes:
  a transparent rod body, and a light-shielding coating is disposed on a side of the rod body opposite to the channel.

According to an embodiment of the present application, an end of the light-shielding rod opposite to the display panel is bonded to the display panel by a transparent adhesive layer.

According to an embodiment of the present application, a thickness of the adhesive layer is less than or equal to 0.1 millimeter.

According to an embodiment of the present application, an orthographic projection region of the adhesive layer covers an orthographic projection region of an end of the light-shielding rod opposite to the display panel in an axial direction parallel to the through hole.

According to an embodiment of the present application, a first light-absorbing layer is disposed on a side of the first light-blocking portion opposite to the through hole, wherein a light absorption rate of the first light-absorbing layer is greater than 0 and less than or equal to 70%.

According to an embodiment of the present application, a second light-absorbing layer is disposed on a side of the second light-blocking portion opposite to the backlight module, wherein a light absorption rate of the second light-absorbing layer is greater than 0 and less than or equal to 70%.

According to an embodiment of the present application, the light absorption rate of the first light-absorbing layer is less than or equal to the light absorption rate of the second light-absorbing layer.

According to an embodiment of the present application, the display panel includes a display region, the display region includes an ambient light-transmission region for acquiring ambient light, and the through hole is disposed coaxially with the ambient light-transmission region.

According to an embodiment of the present application, the display panel includes an array substrate, a color film substrate disposed opposite to the array substrate, and a liquid crystal layer disposed between the array substrate and the color film substrate.

According to an embodiment of the present application, the display device including a sensor module, wherein the sensor module is disposed in a one-to-one correspondence in position with the channel, and the sensor module is configured to collect the ambient light through the channel and the ambient light-transmission region.

According to an embodiment of the present application, the sensor module is at least one or a combination of a camera module, a fingerprint recognition sensor module, a structured light sensor module, a distance sensor module, a light sensor module, and a time-of-flight sensor module.

Beneficial Effects

The beneficial effects of the embodiments of the present disclosure are as follows. Embodiments of the present application provide a display device, the display device includes a display panel, a backlight module disposed on a back side of the display panel, and a light-blocking member. The backlight module is formed with a through hole penetrating the backlight module. The light-blocking member is at least partially disposed in the through hole, and the light-blocking member includes a channel corresponding to the through hole. The light-blocking member can isolate other components of the backlight module from the channel, preventing the light in the backlight module from being irradiated into the channel, thereby solving the problem that the light leaks easily into the through hole of the backlight module in the existing under-screen camera display devices.

BRIEF DESCRIPTION OF THE DRAWINGS

In order to explain the embodiments or the technical solutions in the prior art more clearly, the following will briefly introduce the drawings that need to be used in the description of the embodiments or the prior art. Obviously, the drawings in the following description are only the disclosed embodiments. Those of ordinary skill in the art can obtain other drawings based on these drawings without creative work.

DETAILED DESCRIPTION

Figure 1:
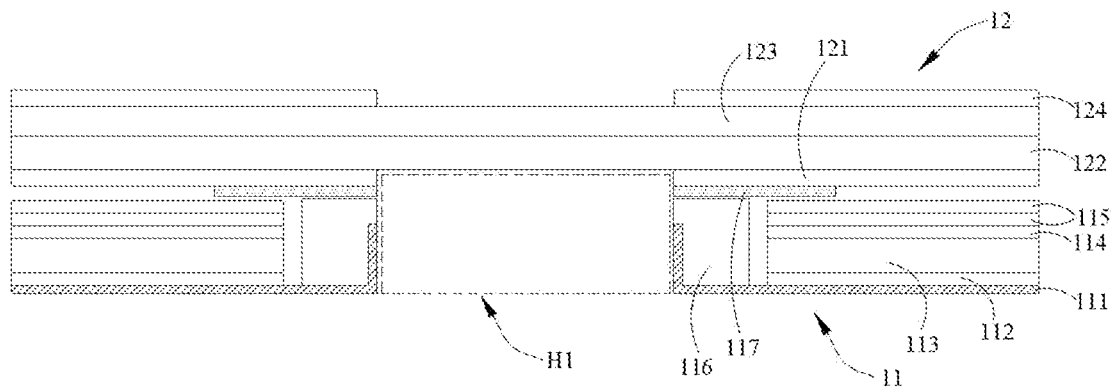
FIG. 1 is a schematic structural diagram of an existing under-screen camera display device.

The description of the following embodiments refers to the attached drawings to illustrate specific embodiments of the present disclosure that can be implemented. Directional terms mentioned in the present disclosure, such as "upper", "lower", "front", "rear", "left", "right", "inside", "outside", "side", etc., are merely for directions of the attached drawings. Therefore, the directional terms used are used to illustrate and understand the present disclosure, rather than to limit the present disclosure. In the drawings, units with similar structures are indicated by same reference numerals.

The present disclosure will be further described below in conjunction with the drawings and specific embodiments.

An embodiment of the present application provides a display device, which will be described in detail below with reference to FIG. 2 to FIG. 6.

Figure 2:
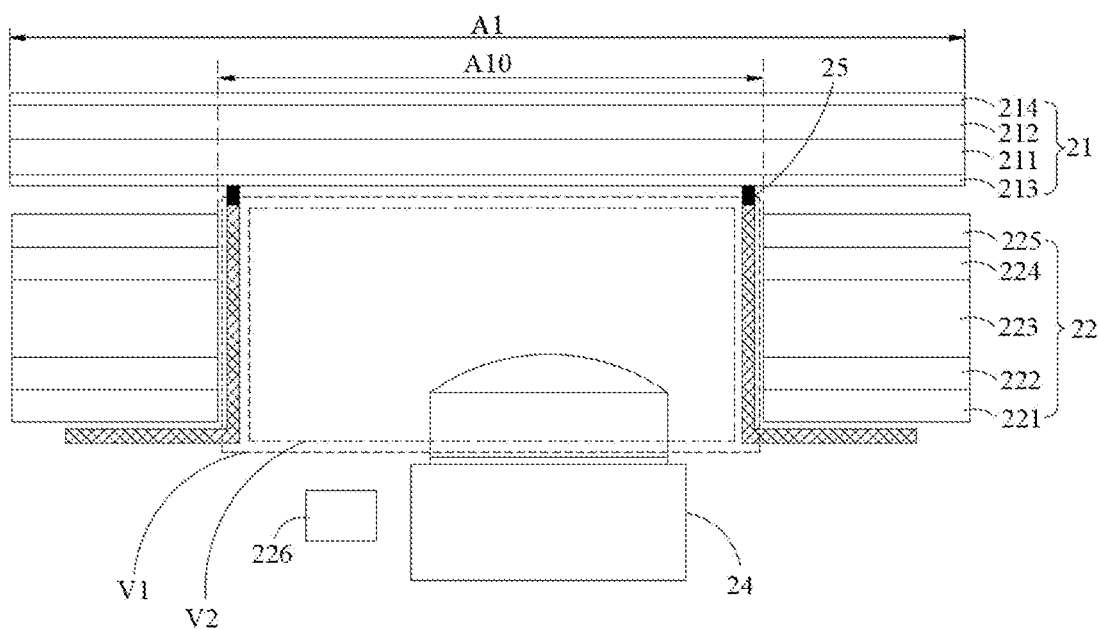
FIG. 2 is a schematic structural diagram of a first display device according to an embodiment of the present application.

As shown in FIG. 2, FIG. 2 is a schematic structural diagram of a first display device according to an embodiment of the present application. The display device 2 includes a display panel 21, a backlight module 22, and a light-blocking member 23. The backlight module 22 is disposed on a back side of the display panel 21.

The backlight module 22 is formed with a through hole V1 penetrating the backlight module 22, the light-blocking member 23 is at least partially disposed in the through hole V1, and the light-blocking member 23 has a channel V2 corresponding to the through hole V1 and penetrating in an axial direction of the through hole V1. The light-blocking member 23 is fixed on a back plate 221 of the backlight module 22.

As shown in FIG. 2, the display panel includes a display region A1 and a non-display region (not shown in the figure) surrounding the display region A1, and the display region A1 includes an ambient light-transmission region A10 for acquiring ambient light. The through hole V1 in the backlight module 22 is disposed coaxially with the ambient light-transmission region A10. The display device 2 further includes a sensor module 24, and the sensor module 24 is disposed in a one-to-one correspondence in position with the channel V2 of the light-blocking member 23. The sensor module 24 can collect ambient light through the channel V2 and the ambient light-transmission region A10.

In an embodiment of the present application, as shown in FIG. 2, the display panel 21 is a liquid crystal display panel, and includes an array substrate 211 and a color film substrate 212 that are disposed oppositely, a liquid crystal layer (not shown in the figure) disposed between the array substrate 211 and the color film substrate 212, a lower polarizer 213 disposed on a side of the array substrate 211 away from the color film substrate 212, and an upper polarizer 214 disposed on a side of the color film substrate 212 away from the array substrate 211.

In an embodiment of the present application, the sensor module 24 is a camera module, and the camera module collects ambient light through the channel V2 and the ambient light-transmission region A10, so as to realize a function of shooting under a screen. In practical applications, a type of sensor module 24 can be selected according to needs, and is not limited to the aforementioned camera module. The sensor module 24 can also be at least one or a combination of a fingerprint recognition sensor module, a camera module, a structured light sensor module, a distance sensor module, a light sensor module, and a time-of-flight sensor module. The backlight module 22 is an edge-lit backlight module, which includes a back plate 221, a reflective sheet 222, a light guide plate 223, a diffusion sheet 224, and a brightness enhancement sheet 225 stacked in sequence. The through hole V1 penetrates the back plate 221, the reflective sheet 222, the light guide plate 223, the diffusion sheet 224, and the brightness enhancement sheet 225.

In an embodiment of the present application, the backlight module 22 should also include a first light source (not shown in the figure) and a second light source 226. The first light source is disposed on a light-incident side of the light guide plate 223, and is used to provide light for image display to other display regions in the display region A1 except the ambient light-transmission region A10.

The second light source 226 is disposed opposite to the channel V2, and is used to provide light for image display to the ambient light-transmission region A10. Number of the second light source 226 can be one or more. The second light source 226 and the sensor module 24 can be disposed in the channel V2, or can be disposed on a side of the backlight module 22 away from the display panel 21 relative to the channel V2. The second light source 226 is a direct-lit light source. In practical applications, a setting configuration of the second light source 226 can be selected according to requirements, and is not limited to the above-mentioned direct-lit light source, and can also be an edge-lit light source.

Figure 3:
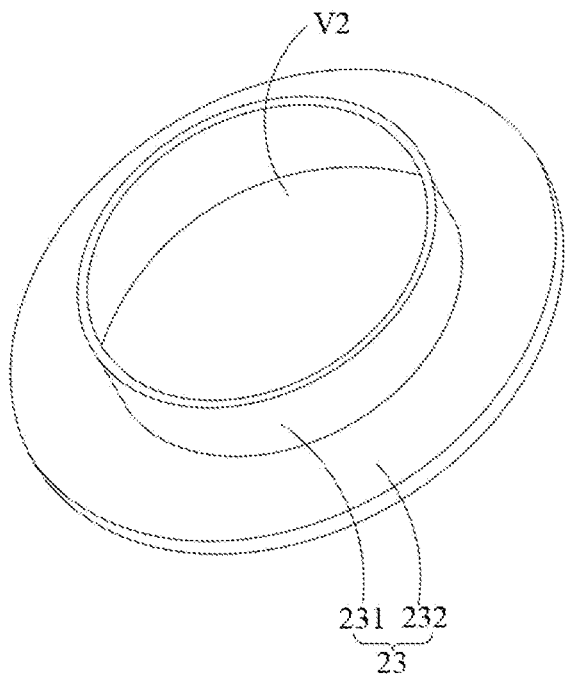
FIG. 3 is a schematic structural diagram of a light-blocking member according to an embodiment of the present application.

It should be noted that FIG. 2 only illustrates the second light source 226 and the sensor module 24 included in the display device according to the embodiments of the present application. The positional relationship between the second light source 226 and the sensor module 24, the backlight module 22, and the light-blocking member 23, and the number of the second light source 226 shown in FIG. 2 do not represent the positional relationship between the second light source 226 and the sensor module 24, the backlight module 22, and the light-blocking member 23, and the number of the second light source 226 in practical applications. As shown in FIG. 2 and FIG. 3, FIG. 3 is a schematic structural diagram of a light-blocking member 23 according to an embodiment of the present application. The light-blocking member 23 includes a first light-blocking portion 231 and a second light-blocking portion 232. The first light-blocking portion 231 has a hollow cylindrical structure, the first light-blocking portion 231 is at least partially disposed in the through hole V1, the second light-blocking portion 232 is formed by extending an end of the first light-blocking portion 231 away from the display panel 21 to an outside periphery of the first light-blocking portion 231, and the second light-blocking portion 232 is fixed to a bottom of the backlight module 22.

In an embodiment of the present application, the first light-blocking portion 231 is partially disposed in the through hole V1, the second light-blocking portion 232 is formed by extending the end of the first light-blocking portion 231 away from the display panel 21 to the outside periphery of the first light-blocking portion 231 along a radial direction of the through hole V1, and has a hollow ring structure. The first light-blocking portion 231 is perpendicular to a plane where the second light-blocking portion 232 is located, and the channel V2 penetrates the first light-blocking portion 231 and the second light-blocking portion 232. In some other embodiments, an extending direction of the second light-blocking portion 232 is not limited to the radial direction of the above-mentioned embodiment. The second light-blocking portion 232 can also be formed by extending the end of the first light blocking portion 231 away from the display panel 21 to the outside periphery of the first light blocking portion 231 along a direction at a certain included angle with the axial direction of the through hole V1. The included angle can be an acute or obtuse angle, and the degree of the included angle can be set according to the actual situation, and there is no limitation here.

A side of the second light-blocking portion 232 opposite to the back plate 221 is bonded to the back plate 221 by double-sided adhesive. In practical applications, the second light-blocking portion 232 can also be bonded to the back plate 221 by a single-sided adhesive on a side of the second light-blocking portion 232 away from the back plate 221.

Figure 4:
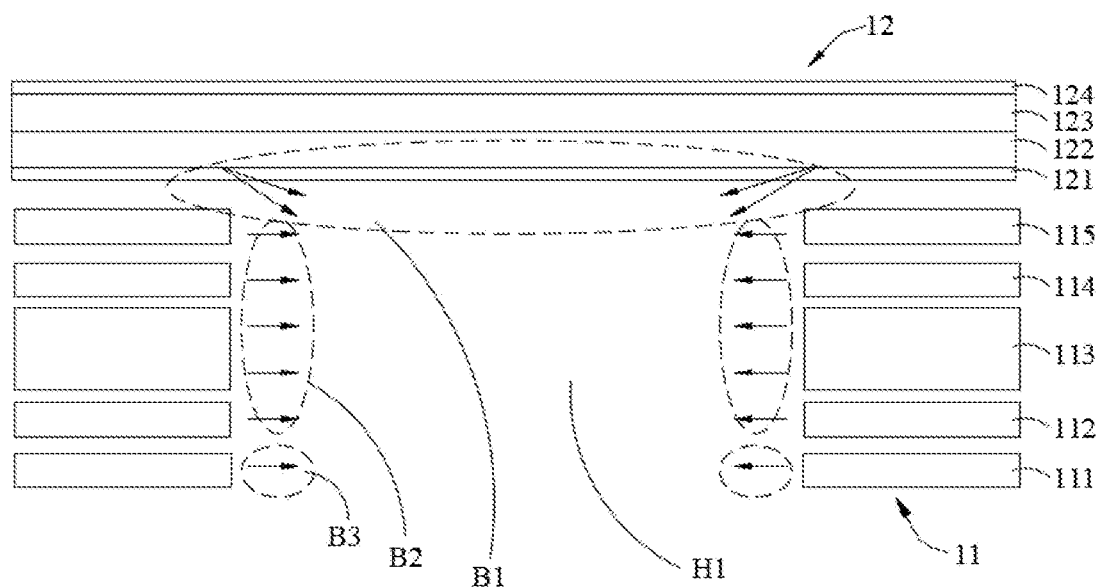
FIG. 4 is a schematic diagram of light leakage of the existing display device according to an embodiment of the present application.

Refer to FIG. 2 and FIG. 4, FIG. 4 is a schematic diagram of light leakage of an existing display device according to an embodiment of the present application. The existing display device shown in FIG. 4 has three light leakage regions, namely a first light leakage region B1, a second light leakage region B2, and a third light leakage region B3. The first light leakage region B1 is above the through hole H1, that is, the first light leakage region B1 is formed at a side of the display panel 12 facing the backlight module 11, and metal patterns in each metal layer inside the display panel 12 can reflect the light emitted by the backlight module 11 into the through hole H1. The second light leakage region B2 is on a side of the through hole H1, the light will be reflected or refracted into the through hole H1 during a propagation in the reflective sheet 112, the light guide plate 113, the diffusion sheet 114, and the brightness enhancement sheet 115. The third light leakage region B3 is at a bottom of the through hole H1, and the back plate 111 is made of metal material, which can reflect the light in the backlight module 11 to the bottom of the through hole H1.

As shown in FIG. 2, the first light-blocking portion 231 disposed in the through hole V1 can separate the second light leakage region B2 in FIG. 4 from an inner space of the through hole H1. A bottom of the first light-blocking portion 231 and the second light-blocking portion 232 can separate the third light leakage region B3 in FIG. 4 from the inner space of the through hole H1. In this way, light from the second light leakage region B2 and the third light leakage region B3 in FIG. 4 can be prevented from entering the inner space of the through hole H1. Returning to the display device shown in FIG. 2, it can be understood that the first light-blocking portion 231 and the second light-blocking portion 232 of the light-blocking member 23 can isolate the light that is irradiated from each of the light leakage regions in the backlight module 22 into the through hole V1 from the channel V2 of the light-blocking member 23.

Furthermore, as shown in FIG. 2, an end of the first light-blocking portion 231 close to the display panel 21 protrudes from the through hole V1 and extends toward the direction of the display panel 21. A portion of the first light-blocking portion 231 protruding from the through hole V1 can be used to block a part of the light emitted from the first light leakage region B1 to the through hole H1 in FIG. 4, thereby further improving light shielding effect of the light-blocking member 23.

Furthermore, an end of the light-blocking member 23 close to the display panel 21 is bonded to a bottom of the display panel 21 by a light shielding adhesive 25.

Refer to FIG. 2 and FIG. 4, in the display device shown in FIG. 2, the end of the first light-blocking portion 231 of the light-blocking member 23 close to the display panel 21 is bonded to the bottom of the display panel 21 by the light shielding adhesive 25 in a sealed manner. A shape of the light-blocking member 23 is similar to a flange ring structure, and can be directly inserted into the through hole V1 after the display panel 21 and the backlight module 22 were assembled, and then fixed. Since there is a certain gap between the end of the light-blocking member 23 close to the display panel 21 and the display panel 21, the light will still be irradiated to the channel V2 shown in FIG. 2 through the first light leakage region B1 shown in FIG. 4. A gap between the first light-blocking portion 231 and the display panel 21 is filled with the light shielding adhesive 25, which can effectively prevent the light reflected from the display panel 21 to the light-blocking member 23 from being irradiated into the channel V2 through the gap between the first light-blocking portion 231 and the display panel 21.

Specifically, a width of the light shielding adhesive 25 is 0.1 millimeter (mm), and a planar shape is annular. In this way, the blocking of light irradiated from the first light source or the second light source 226 to the display panel 21 by the light shielding adhesive 25 can be reduced, preventing a transition line generated at an edge of the ambient light-transmission region A10. In practical applications, the width of the light shielding adhesive 25 can be selected according to requirements, and is not limited to the above-mentioned 0.1 mm, and it can also be 0.08 mm, 0.05 mm, 0.03 mm, etc., or the same as a thickness of the light-blocking member 23. It only needs to be less than or equal to 0.1 mm.

Furthermore, as shown in FIG. 2, the channel V2 is sleeved in the through hole V1, the sensor module 24 can acquire external ambient light through the channel V2, at the same time, the light-blocking member 23 can block the light in the backlight module 22 from being irradiated into the channel V2, thereby improving a sensing effect of the sensor module 24.

Figure 5:
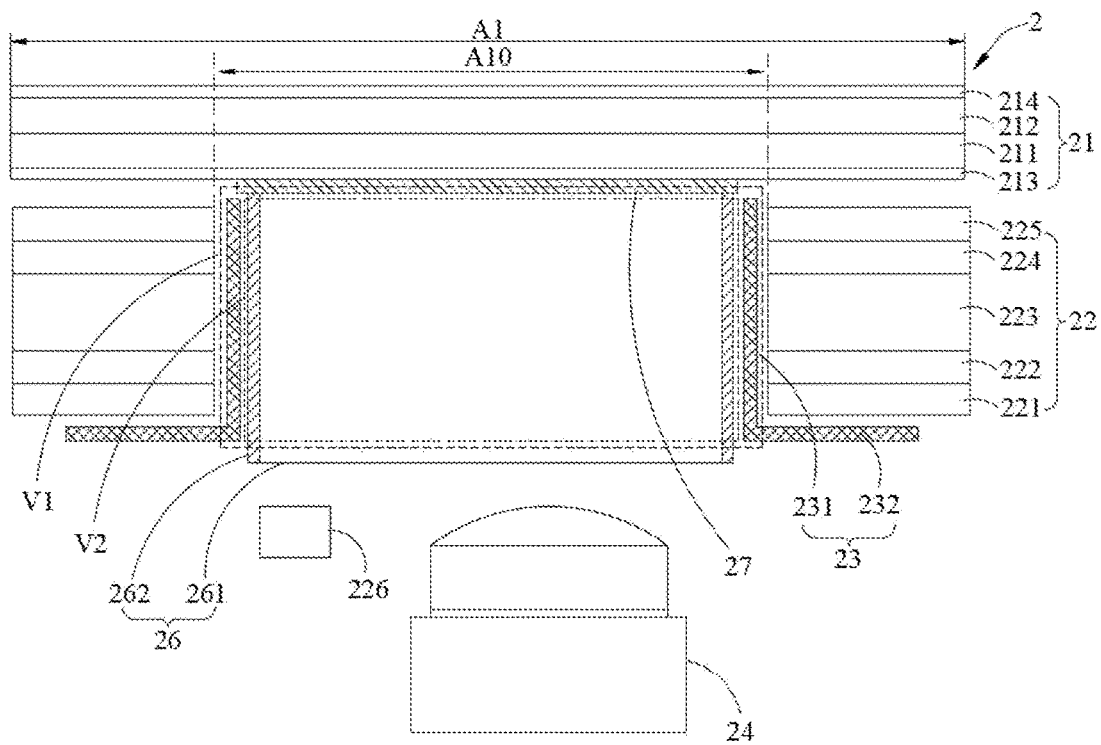
FIG. 5 is a schematic structural diagram of a second display device according to an embodiment of the present application.

As shown in FIG. 5, FIG. 5 is a schematic structural diagram of a second display device according to an embodiment of the present application. The display device 2 further includes a light-shielding rod 26, and the light-shielding rod 26 is at least partially disposed in the channel V2. The light-shielding rod 26 includes a transparent rod body 261, and a light-shielding coating 262 is disposed on a side of the rod body 261 opposite to the channel V2.

The rod body 261 is made of transparent acrylic material, has good light transmission performance, and can meet the light demand of the sensor module 24, improving a shooting effect of the sensor module 24. At the same time, the second light source 226 can be disposed on a bottom or side of the light-shielding rod 26. When the second light source 226 is disposed on the side of the light-shielding rod 26, a region of the light-shielding rod 26 opposite to the second light source 226 may not be disposed with the light-shielding coating 262. In this way, the rod body 261 is used as the light guide plate of the second light source 226, and the light emitted by the second light source 226 is uniformly diffused in the channel V2, thereby increasing the display effect of the ambient light-transmission region A10. In practical applications, material of the rod body 261 can be selected according to requirements, is not limited to the above-mentioned acrylic material, and can also be a transparent material such as polyimide or glass.

A shape of the light-shielding rod 26 is the same as a shape of the channel V2, and a size of the light-shielding rod 26 is adapted to a size of the channel V2. In the embodiment of the present application, the light-shielding rod 26 is in clearance fit with the channel V2, and size of a gap between the light-shielding rod 26 and the channel V2 can be selected according to actual requirements, and is not limited here. In practical applications, a fitting relationship between the light-shielding rod 26 and the channel V2 can be selected according to requirements, is not limited to the above-mentioned clearance fit, and can also be a transition fit or an interference fit.

Material of the light-shielding coating 262 is silver, and a layer of the light-shielding coating 262 can be plated on a side of the rod body 261 by silver plating. A light reflection effect of the silver material is used and can prevent the light emitted by the backlight module 22 and the light reflected by the display panel 21 from being irradiated into the channel V2, so as to enhance the light-shielding effect of the light-shielding rod 26. In practical applications, other light-shielding materials can be used according to requirements, are not limited to the silver mentioned above, and can also be other materials having light-shielding or light reflection effects, and light-shielding materials such as black ink or black polyethylene terephthalate.

In an embodiment of the present application, the end of the light-shielding rod 26 opposite to the display panel 21 is bonded to the display panel 21 by a transparent adhesive layer 27. It is understandable that, in the display device shown in FIG. 5, the light shielding adhesive 25 in FIG. 2 is not used to fill the gap between the first light-blocking portion 231 and the display panel 21. Instead, the end of the light-shielding rod 26 opposite to the display panel 21 is bonded to the display panel 21 by the transparent adhesive layer 27. The light irradiated from the first light leakage region B1 shown in FIG. 4 to the gap between the first light-blocking portion 231 and the display panel 21 in FIG. 5 can be blocked by the light-shielding coating 262 on the light-shielding rod 26. This prevents the light leaking from the first light leakage region B1 shown in FIG. 4 from being irradiated into the channel V2.

Furthermore, an orthographic projection region of the transparent adhesive layer 27 covers an orthographic projection region of an end of the light-shielding rod 26 opposite to the display panel 21 in an axial direction parallel to the through hole V1. That is, an area of the adhesive layer 27 is greater than or equal to an area of the end of the light-shielding rod 26 opposite to the display panel 21.

In an embodiment of the present application, a thickness of the adhesive layer 27 is 0.025 mm. The lesser the thickness of the adhesive layer 27, the smaller the gap between the end of the light-shielding rod 26 close to the display panel 21 and the display panel 21, the more the light leaking from the first light leakage region B1 to the gap between the first light-blocking portion 231 and the display panel 21 that can be blocked by the light-shielding coating 262, and the better the light-blocking effect of the light-blocking rod 26. In practical applications, the thickness of the adhesive layer 27 can be selected according to requirements, is not limited to the above-mentioned 0.025 mm, and can also be 0.1 mm, 0.08 mm, 0.06 mm, etc., as long as it is less than or equal to 0.1 mm.

Specifically, the adhesive layer 27 is an optically clear adhesive (OCA). OCA is colorless and transparent, and has high light transmittance and good bonding strength. OCA is in a cured state at room temperature, and is easy to be cut into a tape shape, thereby reducing difficulty of a manufacturing process of the display device. In practical applications, other adhesive materials can be used according to requirements, are not limited to the above-mentioned optically clear adhesive, and can also be optical clear resin (OCR), photosensitive adhesive, or ultraviolet curing adhesive.

Figure 6:
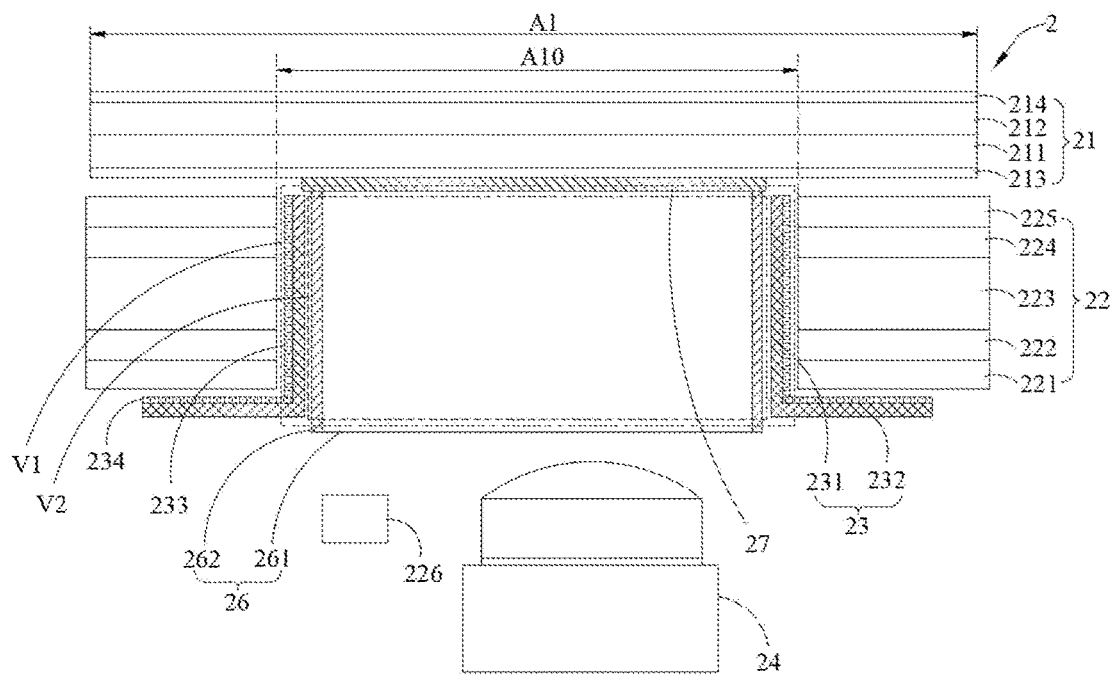
FIG. 6 is a schematic structural diagram of a third display device according to an embodiment of the present application.

As shown in FIG. 6, FIG. 6 is a schematic structural diagram of a third display device according to an embodiment of the present application. A structure of the display device shown in FIG. 6 is roughly the same as that of the display device shown in FIG. 5. The difference is that a first light-absorbing layer 233 is disposed on a side of the first light-blocking portion 231 opposite to the channel V2 in the display device shown in FIG. 6, and the first light-absorbing layer 233 can absorb at least a part of the light irradiated to the first light-blocking portion 231.

Since the first light-blocking portion 231 is made of a metal material and has a certain light reflection effect, when an amount of light reflected by the first light-blocking portion 231 is large, it will cause a larger amount of light to converge around the first light-blocking portion 231, so that the brightness of the peripheral edge of the ambient light-transmission region A10 is significantly greater than the brightness of other display regions, which leads to a problem of uneven display brightness of the display panel. By disposing the first light-absorbing layer 233 on the first light-blocking portion 231, a reflection ability of the first light-blocking portion 231 can be reduced, thereby preventing the brightness of the peripheral edge of the ambient light-transmission region A10 from being greater than the brightness of other display regions.

In an embodiment of the present application, a light absorption rate of the first light-absorbing layer 233 is 50%, and the first light-absorbing layer 233 is a gray light-absorbing layer. In this way, the first light-absorbing layer 233 can have a certain light-absorbing ability and absorbs a part of the light irradiated to the light-blocking member 23 from each of the light leakage regions, but does not absorb the light irradiated to the display panel by the backlight module 22. Therefore, it can prevent a situation that a brightness of a surrounding edge of the ambient light-transmission region A10 is lower than the brightness of other display regions due to the overly strong ability of the first light-absorbing layer 233 to absorb light. In practical applications, the light absorption rate of the first light-absorbing layer 233 can be selected according to requirements, and is not limited to the above-mentioned light absorption rate of 50%. The first light-absorbing layer 233 can also have a light absorption rate of 20%, 40%, 60% or 70%, etc., and only needs to be greater than zero and less than or equal to 70%.

Furthermore, a second light-absorbing layer 234 is disposed on a side of the second light-blocking portion 232 opposite to a bottom of the backlight module 22. Specifically, as shown in FIG. 6, the second light-absorbing layer is disposed on the side of the second light-blocking portion 232 opposite to the back plate 221, and the second light-absorbing layer 234 can be used to absorb the light irradiated from the third light leakage region B3 shown in FIG. 4 to the second light-blocking portion 232 shown in FIG. 6.

Specifically, the light absorption rate of the second light-absorbing layer 234 is 60%, and the second light-absorbing layer 234 is a gray light-absorbing layer. In practical applications, the light absorption rate and color of the second light-absorbing layer 234 can be selected according to requirements, the light absorption rate is not limited to the above 60%, and can also be 30%, 50%, or 70%. It only needs to be greater than 0 and less than or equal to 70%. The second light-absorbing layer 234 is not limited to the gray light-absorbing layer, and can also be a dark gray light-absorbing layer or a black light-absorbing layer.

Furthermore, the light absorption rate of the first light-absorbing layer 233 is less than or equal to the light absorption rate of the second light-absorbing layer 234. Since the second light-blocking portion 232 is disposed at the bottom of the back plate 221 and will not absorb light for displaying images from the backlight module 22, the light absorption rate of the second light-absorbing layer 234 can be greater than or equal to the light absorption rate of the first light-absorbing layer 233. In this way, the light leaking from the back plate 221 of the backlight module 22 to the through hole V1 is further reduced.

In an embodiment of the present application, on a plane perpendicular to an axial direction of the through hole V1, a plane shape of the through hole V1 is circular, and a plane shape of the channel V2 is the same as the shape of the through hole V1. In practical applications, the shape of the through hole V1 can be selected according to requirements, and is not limited to the above-mentioned circular. It can also be any of an ellipse, a rectangular, a drop shape, or an irregular shape. The irregular shape can be in the shape of "bangs", etc., and the shape of the channel V2 needs to be adjusted according to the shape of the through hole V1.

In an embodiment of the present application, material of the light-blocking member 23 is stainless steel. The stainless steel material has good plasticity and rigidity, and it is possible to prepare the light-blocking member 23 with a relatively thin thickness and a certain rigidity, so as to facilitate the installation of the light-blocking member 23. In practical applications, the material of the light-blocking member 23 can be selected according to requirements, is not limited to the above-mentioned stainless steel, and can also be metal materials such as alloys.

In an embodiment of the present application, a thickness of a sidewall of the light-blocking member 23 opposite to the through hole V1 is 0.05 mm, and the sidewall of the light-blocking member 23 opposite to the through hole V1 is the first light-blocking portion 231. The smaller the thickness of the first light-blocking portion 231 having a hollow cylindrical structure, the less the amount of light that needs to be irradiated to the display panel blocked by the light-blocking member 23. In this way, a width of the transition line between the ambient light-transmission region A10 and the adjacent display region can be reduced, thereby improving the display effect of the edge of the ambient light-transmission region A10. In practical applications, the thickness of the sidewall of the light-blocking member 23 can be selected according to requirements, is not limited to the above 0.05 mm, and can also be 0.1 mm, 0.08 mm, 0.03 mm, and so on. Preferably, in order to obtain a better display effect, the thickness of the light-blocking member 23 should be less than or equal to 0.05 mm. In practical applications, considering factors such as production cost, the thickness of the light-blocking member 23 only needs to be less than or equal to 0.1 mm.

The beneficial effects of the embodiments of the present disclosure are as follows. Embodiments of the present application provide a display device, wherein the display device includes a display panel, a backlight module disposed on a back side of the display panel, and a light-blocking member. The backlight module is formed with a through hole penetrating the backlight module. The light-blocking member is at least partially disposed in the through hole, and the light-blocking member includes a channel corresponding to the through hole. The light-blocking member can isolate the backlight module from the channel, preventing the light in the backlight module from being irradiated into the channel, thereby solving the problem that the light leaks easily into the through hole of the backlight module in the existing under-screen camera display devices.

In summary, although the preferred embodiments of the present application are disclosed as above, the above preferred embodiments are not intended to limit the application. Those of ordinary skill in the art can make various changes and modifications without departing from the spirit and scope of the application. Therefore, the scope of protection of the present application is based on the scope defined by the claims.

What is claimed is:

1. A display device, comprising:
a display panel;
a backlight module disposed on a back side of the display panel, wherein the backlight module is formed with a through hole penetrating the backlight module;
a light-blocking member at least partially disposed in the through hole, wherein the light-blocking member comprises a channel corresponding to the through hole, and
a light-shielding rod, wherein the light-shielding rod is at least partially disposed in the channel, wherein the light-shielding rod comprises a transparent rod body, and a light-shielding coating is disposed on a side of the rod body opposite to the channel, and
wherein the display panel comprises a display region, the display region comprises an ambient light-transmission region for acquiring ambient light, and the through hole is disposed coaxially with the ambient light-transmission region.

2. The display device according to claim 1, wherein the light-blocking member further comprises:
a first light-blocking portion with a hollow cylindrical structure, wherein the first light-blocking portion is at least partially disposed in the through hole; and
a second light-blocking portion formed by extending an end of the first light-blocking portion away from the display panel to an outside periphery of the first light-blocking portion, wherein the second light-blocking portion is fixed on a side of the backlight module away from the display panel.

3. The display device according to claim 2, wherein an end of the first light-blocking portion close to the display panel protrudes from the through hole.

4. The display device according to claim 3, wherein the end of the first light-blocking portion close to the display panel is bonded to a bottom of the display panel by a light-shielding adhesive.

5. The display device according to claim 4, wherein the channel is sleeved in the through hole.

6. The display device according to claim 1, wherein a planar shape of the through hole on a plane perpendicular to an axial direction of the through hole is any one of circular, elliptical, rectangular, drop-shaped, or irregular-shaped, and a planar shape of the channel is the same as the planar shape of the through hole.

7. The display device according to claim 1, wherein the light-blocking member is made of metal.

8. The display device according to claim 7, wherein a thickness of a sidewall of the light-blocking member opposite to the through hole is less than or equal to 0.1 millimeter.

9. The display device according to claim 1,
wherein an end of the light-shielding rod opposite to the display panel is bonded to the display panel through a transparent adhesive layer.

10. The display device according to claim 9, wherein a thickness of the transparent adhesive layer is less than or equal to 0.1 millimeter.

11. The display device according to claim 9, wherein an orthographic projection region of the transparent adhesive layer covers an orthographic projection region of the end of the light-shielding rod opposite to the display panel in an axial direction parallel to the through hole.

12. The display device according to claim 1, wherein the display panel further comprises an array substrate, a color film substrate disposed opposite to the array substrate, and a liquid crystal layer disposed between the array substrate and the color film substrate.

13. The display device according to claim 1, further comprising a sensor module, wherein the sensor module is disposed in a one-to-one correspondence in position with the channel, and the sensor module is configured to collect the ambient light through the channel and the ambient light-transmission region.

14. The display device according to claim 13, wherein the sensor module is at least one or a combination of a camera module, a fingerprint recognition sensor module, a structured light sensor module, a distance sensor module, a light sensor module, and a time-of-flight sensor module.

15. A display device, comprising:
a display panel;
a backlight module disposed on a back side of the display panel, wherein the backlight module is formed with a through hole penetrating the backlight module;
a light-blocking member at least partially disposed in the through hole, wherein the light-blocking member comprises a channel corresponding to the through hole; and
a light-shielding rod, wherein the light-shielding rod is at least partially disposed in the channel, wherein the light-shielding rod comprises a transparent rod body, and a light-shielding coating is disposed on a side of the rod body opposite to the channel.

16. A display device, comprising:
a display panel;
a backlight module disposed on a back side of the display panel, wherein the backlight module is formed with a through hole penetrating the backlight module; and
a light-blocking member at least partially disposed in the through hole, wherein the light-blocking member comprises a channel corresponding to the through hole,
wherein the light-blocking member further comprises:
a first light-blocking portion with a hollow cylindrical structure, wherein the first light-blocking portion is at least partially disposed in the through hole; and
a second light-blocking portion formed by extending an end of the first light-blocking portion away from the display panel to an outside periphery of the first light-blocking portion, wherein the second light-blocking portion is fixed on a side of the backlight module away from the display panel, wherein a first light-absorbing layer is disposed on a side of the first light-blocking portion opposite to the through hole, wherein a light absorption rate of the first light-absorbing layer is greater than 0 and less than or equal to 70%.

17. The display device according to claim 16, wherein a second light-absorbing layer is disposed on a side of the second light-blocking portion opposite to the backlight module, wherein a light absorption rate of the second light-absorbing layer is greater than 0 and less than or equal to 70%.

18. The display device according to claim 17, wherein the light absorption rate of the first light-absorbing layer is less than or equal to the light absorption rate of the second light-absorbing layer.

\* \* \* \* \*